No. 749,695. PATENTED JAN. 12, 1904.
E. C. & H. L. LITCHFIELD.
FERTILIZER DISTRIBUTER.
APPLICATION FILED OCT. 1, 1903.
NO MODEL. 2 SHEETS—SHEET 2.

Witnesses
E. W. Stewart
Jno. E. Parker

E. C. Litchfield
H. L. Litchfield, Inventors.
by C. A. Snow & Co.
Attorneys

No. 749,695. Patented January 12, 1904.

UNITED STATES PATENT OFFICE.

EDGAR C. LITCHFIELD AND HENRY L. LITCHFIELD, OF WEBSTER CITY, IOWA, ASSIGNORS TO THE LITCHFIELD MFG. CO., OF WEBSTER CITY, IOWA.

FERTILIZER-DISTRIBUTER.

SPECIFICATION forming part of Letters Patent No. 749,695, dated January 12, 1904.

Application filed October 1, 1903. Serial No. 175,344. (No model.)

*To all whom it may concern:*

Be it known that we, EDGAR C. LITCHFIELD and HENRY L. LITCHFIELD, citizens of the United States, residing at Webster City, in the county of Hamilton and State of Iowa, have invented a new and useful Fertilizer-Distributer, of which the following is a specification.

This invention relates to certain improvements in machines for distributing or spreading fertilizer, and relates more particularly to that general class of devices in which a wheeled box or wagon-body is provided with a movable bottom portion in the nature of a slatted conveyer-belt that travels the fertilizer continuously toward a discharge-point. In mechanisms of this class the lower run of the conveyer-belt has a tendency to accumulate any fertilizer which may fall through the cracks in the upper run of the conveyer-belt, and this materially interferes with the proper operation of the mechanism, especially during cold weather, where the accumulated fertilizer freezes and clings tightly to the belt.

The principal object of the invention is to provide a distributer or conveyer in which one run or flight shall present a practically continuous supporting-surface, while the lower run or flight will be open in order to permit the ready passage of any material which may fall from the upper flight.

A further object of the invention is to provide a conveyer in which a plurality of slats or cross-bars are pivotally connected to one or more link belts or similar supports and so arranged as to automatically open while traveling toward the loading-point and to automatically close and remain closed while traveling to the discharge-point.

With these and other objects in view, as will hereinafter more fully appear, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
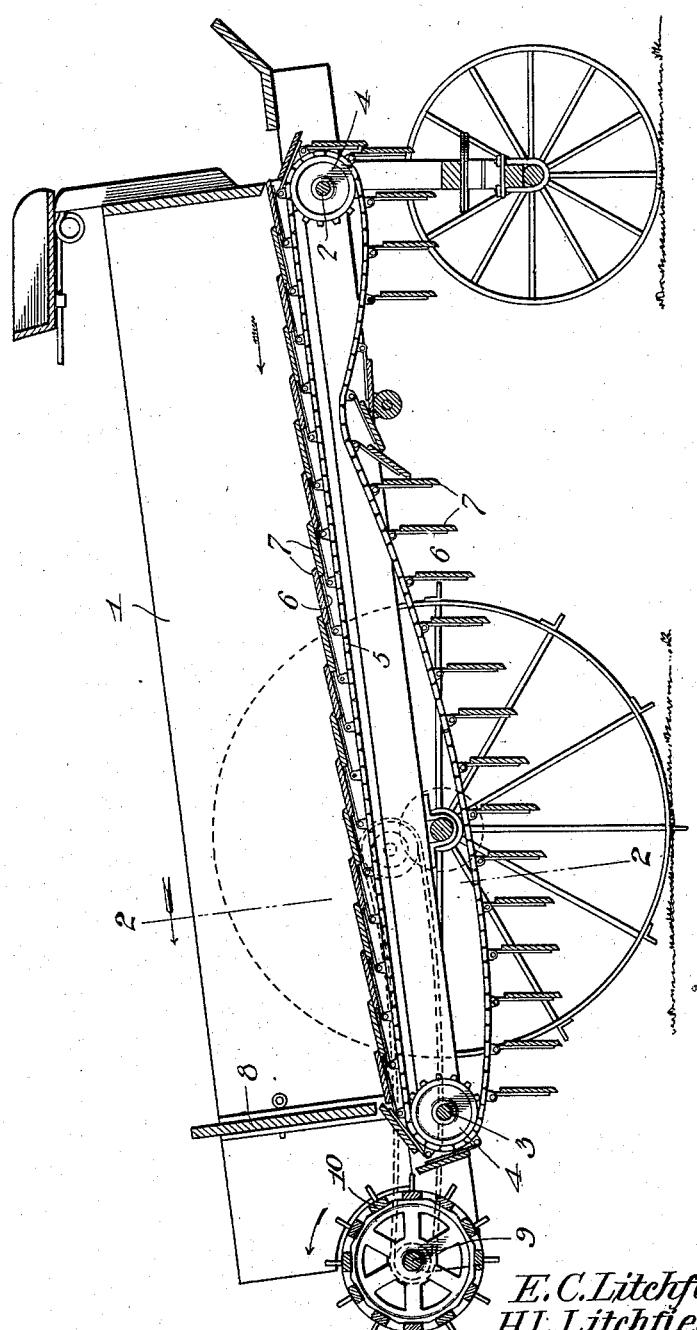
Figure 2:
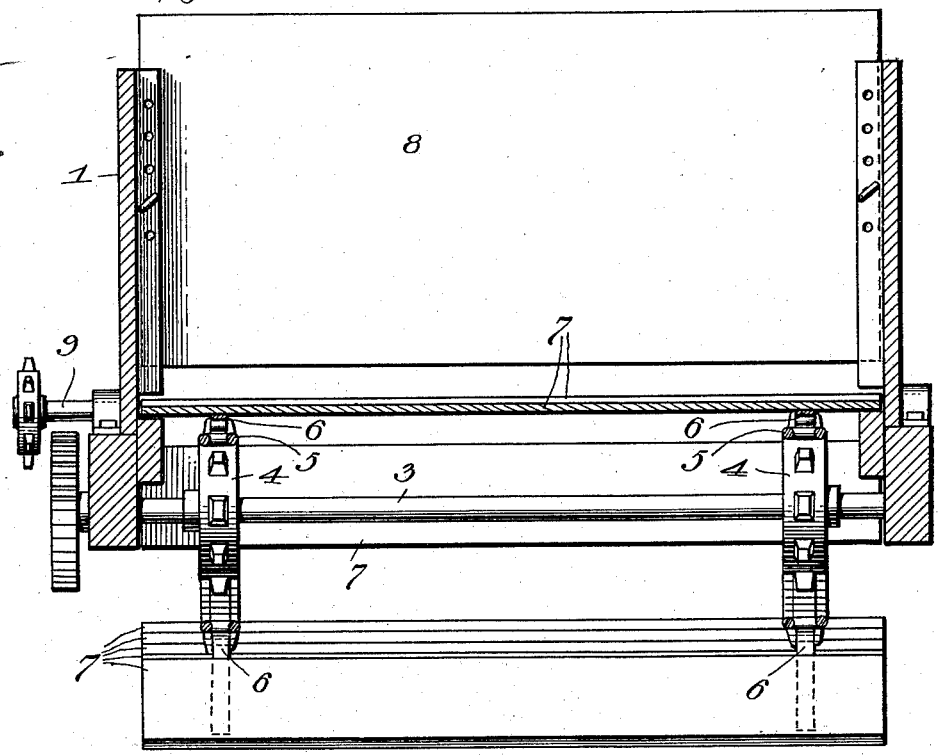
Figure 3:
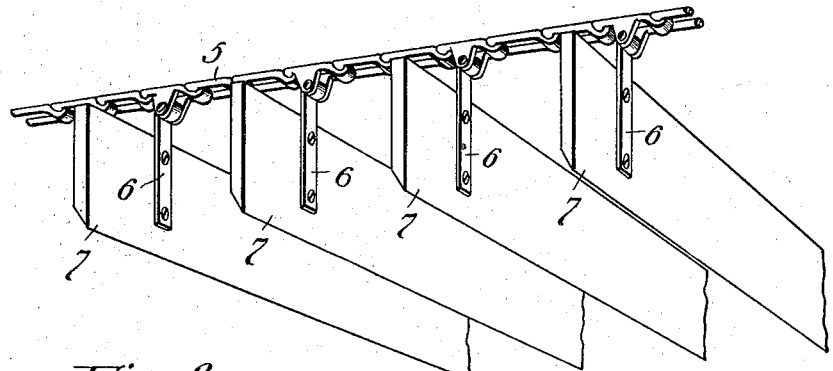

In the accompanying drawings, Figure 1 is a longitudinal sectional elevation of a distributer constructed in accordance with the invention. Fig. 2 is a transverse sectional elevation of the same on the line 2 2 of Fig. 1. Fig. 3 is a detail perspective view of a portion of the conveyer detached.

Similar numerals of reference are employed to indicate corresponding parts throughout the several figures of the drawings.

In the drawings, 1 designates a wheeled box or wagon-body, which may be of any desired construction. Near the front and rear ends of the box are arranged bearings for the reception of transversely-disposed shafts 2 and 3, and on these shafts are arranged sprocket-wheels 4, over which pass link belts 5, the latter being spaced apart for a distance somewhat less than the width of the box.

To the link belts are pivoted arms 6, and to the outer edge of said arms are secured transverse slats or cross-bars 7, the width of the slats being greater than distance between adjacent pivoting points of the arms, so that when the slats are in alinement with the link belts they will form a continuous conveyer-surface, and when free said slats will assume a vertical position by gravity and permit ready passage of any fertilizer or other material which may fall from the operating portion of the conveyer. The arms are preferably of greater length than the width of the slats, so that the weight of the latter may be more effectually employed to accomplish the opening movement, although it will be understood that the edge portions proper of the slats may be pivotally connected to the link belts, and such a construction may be properly employed with some classes of fertilizers or in the handling of other material that is not likely to adhere to the slats and by binding them together prevent opening movement by gravity.

Near the rear end of the box or wagon-body is an end-gate 8, which may be opened to any desired extent in order to regulate the quantity of fertilizer distributed, and at the rear end of the framework is a transversely-disposed shaft 9, carrying a toothed roller 10, that serves to break up any clods in the fertilizer and to evenly distribute the same.

In the operation of the device the upper flight of the conveyer forms a continuous bottom for the fertilizer-containing box, and said conveyer is traveled in such manner as to gradually move the fertilizer to the rear or discharge end. After passing over the rearmost wheels the slats open or assume a vertical position and remain in this position until they gain entrance at the front end of the fertilizer-containing box, so that if any material should drop through the cracks in the upper run of the belt it will immediately fall to the ground and will not accumulate on the lower flight.

It is obvious that a conveyer of this general type may be employed for the handling of any material other than fertilizer without departing from the invention.

Having thus described the invention, what is claimed is—

1. In a fertilizer-distributer, a receptacle, an endless support, and a plurality of slats carried thereby and serving to form a continuous bottom for the receptacle, said slats being movable to open position to permit the passage of the fertilizer between them.

2. In a fertilizer-distributer, a receptacle and an endless slat conveyer, the upper run of the conveyer forming a bottom for the receptacle and the slats of the lower end of said conveyer being arranged in spaced relation to afford a passage for the fertilizer or other material.

3. In a fertilizer-distributer, a receptacle, a conveyer forming a bottom for said receptacle, said conveyer being formed of a plurality of slats overlapping to form the conveyer-bottom and movable by gravity into spaced relation under said bottom.

4. A conveyer comprising an endless support, and a plurality of slats pivotally connected to the support and adapted to open by gravity.

5. A conveyer comprising conveying-belts, and pivotally-mounted slats carried by the belts, the slats being movable to a position in the plane of the belts or to a position at right angles thereto.

6. In a fertilizer-distributer, a receptacle, a conveyer forming a bottom for said receptacle, said conveyer being formed of a plurality of slats movable into spaced relation by gravity, substantially as specified.

In testimony that we claim the foregoing as our own we have hereto affixed our signatures in the presence of two witnesses.

EDGAR C. LITCHFIELD.
   HENRY L. LITCHFIELD.

Witnesses:
 C. W. HELLEN,
 N. H. STOVER.